Jan. 9, 1934.  H. HUEBER ET AL  1,942,647
WINDSHIELD HEATER
Filed Oct. 1, 1930
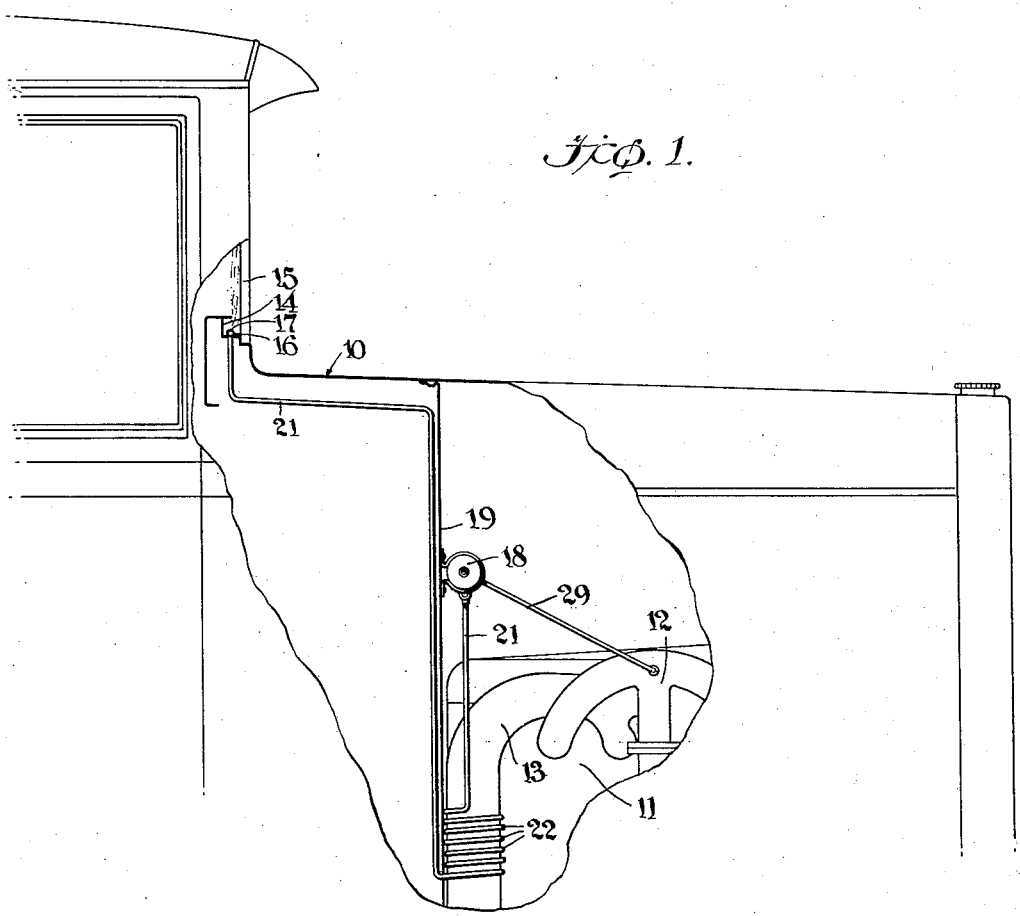
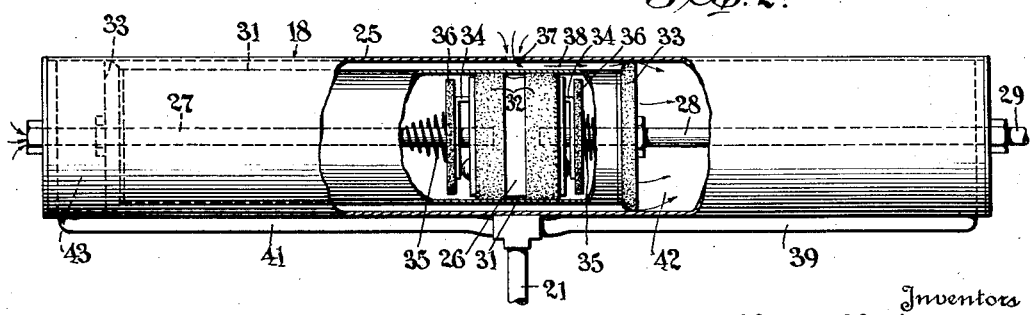
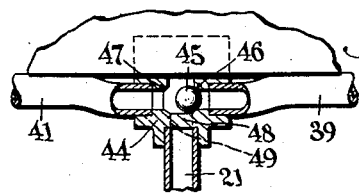
Inventors
Henry Hueber, &
Erwin C. Horton,
By Barton A. Bean Jr.
Attorney Patented Jan. 9, 1934

1,942,647

UNITED STATES PATENT OFFICE 1,942,647

WINDSHIELD HEATER

Henry Hueber, Buffalo, and Erwin C. Horton, Hamburg, N. Y., assignors to Trico Products Corporation, Buffalo, N. Y.

Application October 1, 1930. Serial No. 485,772

4 Claims. (Cl. 20—40.5)

This invention relates to windshield heaters and more particularly to an improved means for conducting heat from the exhaust manifold of the motor of a vehicle to the windshield thereof.

Motor vehicles are conventionally powered by hydrocarbon engines having intake manifolds through which explosive gases are drawn from a carburetor into the engine cylinder, and an exhaust manifold through which the gases burned in the cylinders are conducted therefrom. The present invention relates to a means whereby the condition of suction maintaining in the intake manifold is utilized to effect propulsion of gases about the heated exhaust manifold and over the windshield glass. These gases absorb heat from the manifold and conduct it to the windshield for heating the latter to prevent the accumulation of ice, snow, sleet and the like thereon during winter driving.

The apparatus contemplated by the invention comprises a novel fluid pressure transfer device, whereby the sub-atmospheric or negative pressure maintaining in the intake manifold is converted into greater than atmospheric pressure for energizing atmospheric air to effect its movement through a conduit passing above the exhaust manifold and discharging against the vehicle windshield. The positive circulation of windshield heating gas or air effected by these means is intended to maintain the windshield, during operation of the vehicle in cold weather, in proper condition for clear vision therethrough. The transfer device is intended to apply such pressure to the heating air that the latter may be discharged from inconspicuous vents at the base of windshields with sufficient force to pass upwardly over substantially the entire height of the windshield.

These and other advantages will become apparent from the following description of typical devices embodying the principles of the invention, reference being made to the accompanying drawing wherein:—

Fig. 1 is a fragmentary side elevational view of a motor vehicle, portions thereof being broken away to show the manner of attachment of the devices contemplated by the invention to the motor and windshield of the automotive vehicle;

Fig. 2 is a front elevational view of the pressure transfer device portions thereof being broken away and shown in section to illustrate the interior construction thereof; and Fig. 3 is a detail view of the valve mechanism of the pressure transfer device.

As shown in Fig. 1 the vehicle 10 has an internal combustion engine 11 provided with an intake manifold 12 and an exhaust manifold 13. A recessed molding 14 extends across the body adjacent the bottom of the windshield 15 and supports a tubular member 16 which has a plurality of small openings or apertures 17 along the upper surface thereof. The latter member is disposed in such manner that heated gases or air forced through the tube 16 will be discharged upwardly from the openings 17 over the inner windshield surface. By this disposition of the member 16 on the interior of the vehicle body, dirt, snow and ice are prevented from rendering the device inoperative by closing of the apertures 17 and any excess heat remaining in the gases after passing over the windshield will be effected to heat the interior of the vehicle body.

Air is supplied to the discharge member 16 by a fluid pressure transfer device 18, which is preferably mounted on the dash board 19 of the vehicle, through a connecting conduit or pressure line 21, an intermediate portion 22 of the latter being coiled about the exhaust manifold 13. The intermediate or heating element 22 is adapted to transfer heat from the exhaust manifold to the air supplied by the device 18, the discharge member 16 in turn dispelling the air thus heated against the windshield for melting and preventing the accumulation of ice, snow and the like.

The transfer member includes a cylindrical casing 25 supporting a fixed piston 26 centrally and co-axially thereof, the fixed piston being connected to the inner ends of tubular rods 27 and 28 which are secured to the ends of the casing. The rod 27 is open to the atmosphere at its outer end while the rod 28 communicates through a pipe line 29 with the intake manifold 12. Valve means, not illustrated, are preferably interposed along the suction passage between the fixed piston 26 and the manifold 29 to control the passage of air from the transfer device into the manifold. A substantially closed and movable cylindrical piston 31 is fitted in the casing about the fixed piston 26, the latter being provided with packing cups 32 to effect an air-tight seal therewith. Other cups having outwardly turned flanges 33 are fitted on the ends of the movable piston 31 for engagement with the interior walls of the casing and for providing air-tight packing about the rods 27 and 28.

The piston 26 contains suitable valve means and passages for alternately opening and closing communication between the rod 27 and the interior of the movable piston on the opposite sides of the fixed piston and for alternately opening and closing communication between the piston interiors and the rod 28. The valve means are preferably as disclosed in Patent No. 1,697,358, patented January 1, 1929, and include valve actuating members 34, slidable relative to the piston in directions axially thereof and helical springs 35 disposed over the rods 27 and 28 and spaced from the members 34 by felt buffing strips 36. In the operation of the valve mechanism it will be assumed that the movable piston is travelling from right to left as viewed in Fig. 2, the interior of the movable piston to the right of the fixed piston being in communication with the atmospheric or inlet tube 27 and the opposing piston interior being in communication with the suction or outlet tube 28. As the right end of the movable piston 31 approaches the fixed piston, the piston 31 will abut the right spring 35.

Continuation of this movement will flex the right spring until compression therein is sufficient to snap the valve actuating members 34 to the right, this effecting a reversal of the valve arrangement and causing communication to be opened between the tube 28 and the left interior of the movable piston and closed between the tube 28 and the right interior. Simultaneously communication with the tube 27 will be opened to the right interior and closed to the left interior. By this change atmospheric pressure will be caused to maintain in the right interior of the piston and a condition of sub-atmospheric pressure or suction will maintain in the left interior thereby effecting movement of the piston 31 to the right. As the piston approaches its limit of movement to the right, the left end thereof will abut the right spring 35 again effecting reversal of the valve action, causing the piston to reverse its direction of travel.

An atmospheric port or vent 37 is formed centrally of the casing 25, opening the space 38 between the casing and piston 31 to the atmosphere. Tubes 39 and 41 connect the respective chambers 42 and 43, which extend between the outer ends on the casing and the right and left ends of the movable piston 31, to a valve housing 44. The latter is connected to the pressure line 21 and has passages extending between the pressure line and the tubes 39 and 41. A ball valve 45 in the housing is adapted to fit against the seat 46 to close the passage to the tube 39 and against an opposed seat 47 to close the passage to the tube 41 and the pressure line. A web 48 extends across the outlet port 49 leading to the line 21 and prevents the ball valve from closing the latter.

In operation suction maintaining in the intake manifold will, as hereinbefore described, cause the movable piston 31 to reciprocate in the casing 25. The movement of the piston to the left will cause fluid in the chamber 43 to be forced under pressure through the tube 41 into the pressure line 21, the movement of the fluid pressing the valve 45 against the seat 46. Such piston movement will cause a condition of less than atmospheric pressure in the chamber 42, causing the valve 45 to be retained against the seat 46 and air to be drawn through the port 37, the passage 38, and around the outwardly cupped peripheries of the right packing member 33 into the chamber 42. Upon reversal of the piston movement the fluid or air in the latter chamber will be forced through the tube 39 to the line 21, the valve 45 being forced against the seat 47. Air will simultaneously be drawn through the port and passage 38 into the left chamber 43.

It will now be understood that the partial vacuum maintained in the intake manifold 12 is rendered effective to force a substantially continuous supply of air under pressure into the pressure line 21. This air passes through the heating element 22, absorbing heat from the exhaust manifold 13, and is discharged from the apertured member 16 against the windshield 15. The single moving piston 31 of the pressure transfer device 18, reciprocated in the casing 25, is effective to alternately draw into and alternately discharge air from the opposite chambers 42 and 43, the intake and exhaust of air being controlled by the unidirectional packing cups 33, which will pass fluid in one direction and serve as inlet valves, and the single outlet valve 45 which controls both of the exhaust passages 39 and 41. The alternate suction and pressure effective within the movable piston reacts inwardly thereof against the fixed piston 26 to reciprocate the piston 31.

It will be further understood that the apparatus described is merely exemplary of the principles of the invention which may be embodied in other forms made within the scope of the appended claims.

What is claimed is:

1. In combination with a vehicle having an internal combustion engine and a windshield, said engine being provided with an intake manifold, a pressure transfer device, a suction line connecting said device and said intake manifold, a pressure line extending from said transfer device to said windshield, and heating means associated with said pressure line, said device comprising a casing, means in said casing movable relative thereto by suction maintaining in said suction line, said means being effective upon movement thereof to displace fluid in said casing to create a condition of pressure in said pressure line.

2. In combination with a vehicle having a windshied and an internal combustion engine, provided with an intake manifold and an exhaust manifold, a heating conduit associated with said exhaust manifold and opening adjacent to said windshield, and pressure transfer means associated with said intake manifold and said heating conduit, said pressure transfer means being operable by suction maintaining in said intake manifold to effect movement of fluid through said heating conduit to said windshield.

3. Means operable by suction maintaining in the intake manifold of a vehicle for discharging heated fluid against the windshield thereof comprising a discharge tube and a heating element communicating therewith, a casing, a movable element therein, valve means for applying the suction maintaining in said manifold to said movable element to effect movement thereof within said casing, and other valve means associated with said casing whereby fluid displaced in said casing by said movable element is directed into said heating element and discharge tube.

4. Means operable by suction maintaining in the intake manifold of a vehicle for discharging air against the windshield thereof comprising a discharge line, a casing, a piston movable in said casing, means for alternately applying suction to the ends of said piston to effect reciprocation thereof within said casing, and valve means associated with said casing and discharge line for directing air displaced in said casing by the reciprocation of said piston into said discharge line.

HENRY HUEBER.
ERWIN C. HORTON.